United States Patent
Sugimoto (10) Patent No.: US 8,289,834 B2
(45) Date of Patent: Oct. 16, 2012

(54) OFDM SIGNAL RECEIVING SYSTEM

(75) Inventor: Masahiko Sugimoto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 363 days.

(21) Appl. No.: 12/716,789

(22) Filed: Mar. 3, 2010

(65) Prior Publication Data

US 2010/0302931 A1  Dec. 2, 2010

(30) Foreign Application Priority Data

May 26, 2009  (JP) .................................. 2009-126713

(51) Int. Cl.
*H04J 11/00* (2006.01)

(52) U.S. Cl. ....................................... 370/203; 370/208

(58) Field of Classification Search .................. 370/203, 370/208, 210, 206
See application file for complete search history.

(56) References Cited

U.S. PATENT DOCUMENTS 8,045,658 B2 * 10/2011 Kawauchi et al. ............ 375/344
2009/0285086 A1 * 11/2009 Adachi ......................... 370/210

FOREIGN PATENT DOCUMENTS

JP  2004-336279  11/2004
JP  2008-118567   5/2008

* cited by examiner

*Primary Examiner* — Brenda H Pham
(74) *Attorney, Agent, or Firm* — Turocy & Watson, LLP (57) ABSTRACT

A signal receiving unit receives the OFDM signal and to convert the OFDM signal into a baseband OFDM signal. A time wave operation unit performs a predetermined calculation on a time wave signal that is an output of the signal receiving unit. A Fourier transform unit performs a Fourier transform on an output of the time wave operation unit. A frequency component extraction unit extracts a specific frequency component from an output of the Fourier transform unit. An inverse Fourier transform unit performs an inverse Fourier transform on the frequency component extracted by the frequency component extraction unit. A reception quality measurement unit measures quality of an output signal of the inverse Fourier transform unit and generate reception quality data. A time wave control unit controls the time wave operation unit based on the reception quality data.

10 Claims, 11 Drawing Sheets

| TERRESTRIAL DIGITAL TRANSMISSION SIGNAL (13 SEGMENTS) ||||
|---|---|---|---|
| SIGNAL TYPE | NUMBER OF SIGNAL | MODULATION TYPE | INSERTION INTERVAL |
| AC SIGNAL | 52 | DBPSK | 1 SYMBOL |
| TMCC SIGNAL | 104 | DBPSK | 1 SYMBOL |
| DATA SIGNAL | 4992 | OTHERS | 1 SYMBOL |
| SP SIGNAL | 468 | NON-MODULATION | 4 SYMBOLS |

OFDM SIGNAL RECEIVING SYSTEM

CROSS REFERENCE TO RELATED APPLICATION

This application is based upon and claims the benefit of priority from the prior Japanese Patent Application No. 2009-126713, filed on May 26, 2009, the entire contents of which are incorporated herein by reference.

FIELD OF THE INVENTION

The invention relates to an orthogonal frequency division multiplexing (OFDM) signal receiving system, and especially to an OFDM signal receiving system which uses a reception quality measurement technique in OFDM modulation.

DESCRIPTION OF THE BACKGROUND

In an OFDM signal receiving system, factors deteriorating an OFDM signal exist. The factors are white noise, phase noise, multipath inter-symbol interference, inter-code interference, rapid moving fading, spurious interference, channel interference, for example. Improvements for eliminating these deteriorating factors have been studied in various technical areas.

The improvements are divided into two types. Some of the improvements are in time domain before Fast Fourier Transform (FFT). Others of the improvements are in frequency domain after FFT. In both types of improvements, reception quality measurement is required to determine the effect of each of the improvements.

Japanese Patent Application Publication No. 2004-336279 and Japanese Patent Application Publication No. 2008-118567 disclose an OFDM signal receiving system which calculates S/N (Signal to Noise ratio) from an OFDM signal in the frequency domain after FFT, and uses the S/N to determine the reception quality of received data.

There is a case in which S/N data is measured by calculating deviation from original reference point for each demodulated data. In this case, a deviation from original reference point set by a transmitting side is calculated. Therefore, generally, as a carrier for measuring S/N data, a subcarrier of low modulation degree such as BPSK (Binary Phase Shift Keying) or non modulation is selected rather than a subcarrier modulated by a modulation method having high modulation degree such as 64QAM (Quadrature Amplitude Modulation).

The S/N data calculated in this way is used for FFT window search. By the FFT window search, an optimal position of FFT window is set for an OFDM signal in the time domain.

The FFT window search will be described with reference to FIGS. 1 to 2.

Figure 1:
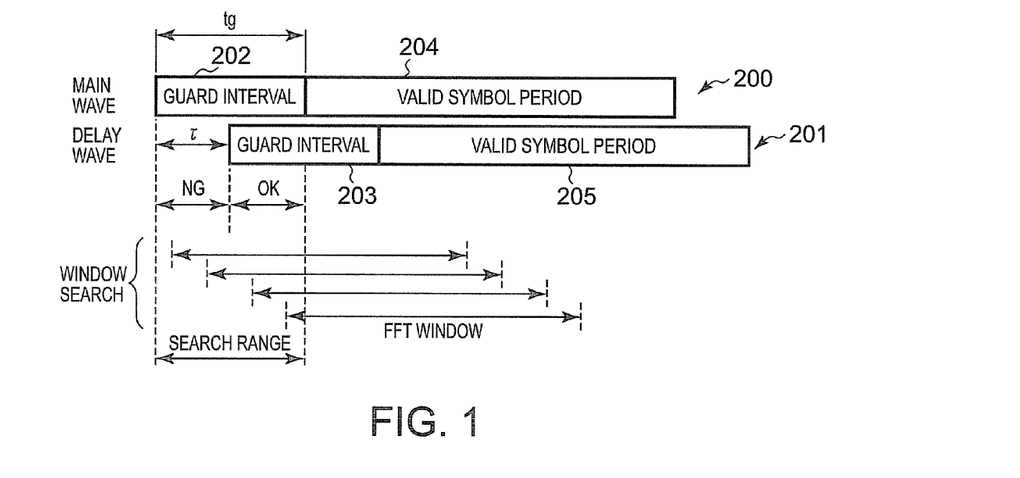
FIG. 1 is a diagram illustrating a relationship among an FFT window, a main wave, a delay wave which hits a reflecting object and reaches a receiving side through a path different from that of the main wave.

FIG. 1 illustrates a main wave (direct wave) 200, a delay wave (reflected wave) 201 which hits a reflecting object and reaches a receiving side through a path different from that of the main wave, and the FFT window.

The main wave 200 includes a guard interval 202 and a valid symbol period 204. The delay wave 201 includes a guard interval 203 and a valid symbol period 205. The delay wave 201 at this time indicates a wave having a delay time ti in the guard interval 202 (=tg) of the main wave.

By moving the FFT window in the time axis direction and performing the FFT window search, a demodulation timing (FFT window position), at which S/N of an FFT output becomes optimal, can be obtained. When the setting of the FFT window position is in a non-permissible range, deterioration of reception performance is large, and when the setting of the FFT window position is in a permissible range, deterioration of reception performance is small.

Figure 2:
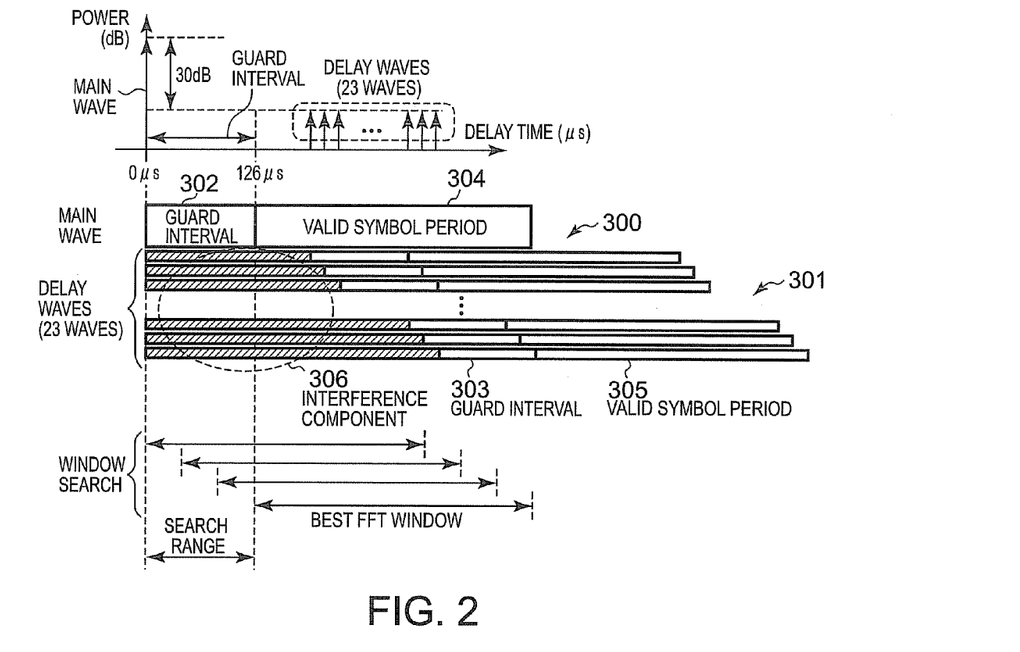
FIG. 2 is a diagram illustrating an example of a delay profile in which the main wave, with respect to the delay wave, causes deterioration of reception performance.

FIG. 2 illustrates an example of a delay profile in a case in which a delay wave 301 causes deterioration of reception performance of a main wave 300.

The main wave 300 includes a guard interval 302 and a valid symbol period 304. The delay wave 301 includes an interference component 306, a guard interval 203, and a valid symbol period 305.

In the reception environment at this time, there are 23 delay waves 301 of mode 3, guard ⅛ (guard interval 303 (=126 μs)), and having a strength of D/U (Desire to Undesire ratio)=30 dB for a signal amplitude peak of the main wave 300. In the example illustrated in FIG. 2, the delay times of the 23 waves appear every 5 μs at regular intervals from 150 μs. The environment is based on an actual example observed.

A search range of the FFT window search is within the guard interval of the main wave. An optimal window position needs to be detected based on the search result of the range. A window position, at which an amount of interference component included in the window (an amount of symbol component included in adjacent window) is minimum, is the optimal FFT window position. When the window position is not optimal, the reception performance deteriorates.

In both cases of FIGS. 1 and 2, the OFDM signal receiving system searches the received OFDM signal, and measures S/N of the received signal for every search to find the optimal FFT window position. The OFDM signal receiving system sets the window position at which the measured S/N is maximum as the optimal window position.

SUMMARY OF THE INVENTION

An aspect of the present invention provides an OFDM signal receiving system for receiving an OFDM signal, which includes a signal receiving unit configured to receive the OFDM signal and to convert the OFDM signal into a baseband OFDM signal, a time wave operation unit configured to perform a predetermined calculation on a time wave signal that is an output of the signal receiving unit, a Fourier transform unit configured to perform a Fourier transform on an output of the time wave operation unit, a frequency component extraction unit configured to extract a specific frequency component from an output of the Fourier transform unit, an inverse Fourier transform unit configured to perform an inverse Fourier transform on the frequency component extracted by the frequency component extraction unit;

a reception quality measurement unit configured to measure quality of an output signal of the inverse Fourier transform unit and generate reception quality data, and a time wave control unit configured to control the time wave operation unit based on the reception quality data.

An aspect of the present invention provides an OFDM signal receiving system for receiving an OFDM signal, which includes a signal receiving unit configured to receive the OFDM signal and to convert the OFDM signal into a baseband OFDM signal, a Fourier transform unit configured to perform a Fourier transform on an output of the signal receiving unit, a frequency wave operation unit configured to perform a predetermined calculation on a frequency wave signal that is an output of the Fourier transform unit, a frequency component extraction unit configured to extract a specific frequency component from an output of the frequency wave operation unit, an inverse Fourier transform unit configured to perform an inverse Fourier transform on the frequency component extracted by the frequency component extraction unit, a reception quality measurement unit configured to measure quality of an output signal of the inverse Fourier transform unit and generate reception quality data, and a frequency wave control unit configured to control the frequency wave operation unit based on the reception quality data.

DETAILED DESCRIPTION OF THE INVENTION

Figure 3:
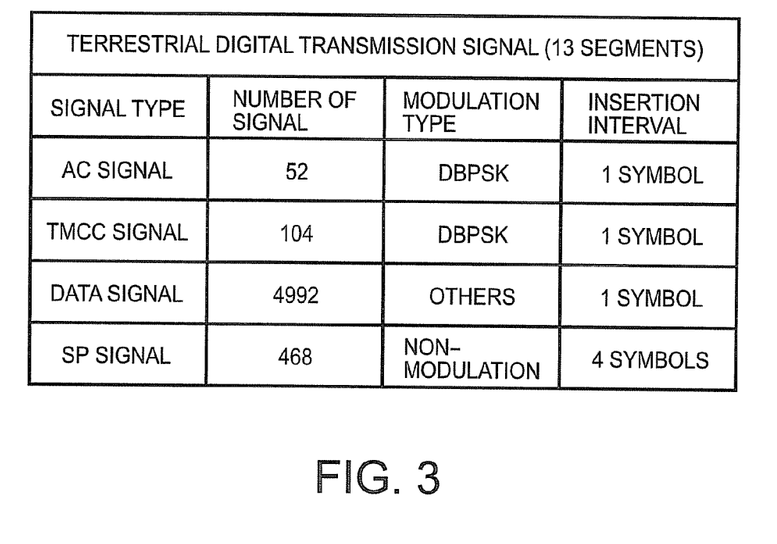
FIG. 3 is a diagram illustrating a comparison result of characteristics of signals which can be used to detect S/N.

FIG. 3 illustrates a comparison result of characteristics of signals which can be used to detect S/N.

When considering 13-segment OFDM signal as a terrestrial digital transmission signal, signals, in which S/N is detected, are a pilot signal and a data signal. The pilot signal includes an Auxiliary Channel signal (hereinafter, represented as "AC signal"), a Transmission and Multiplexing Configuration Control signal (hereinafter, represented as "TMCC signal"), and a Scattered Pilot signal (hereinafter, represented as "SP signal").

Since the AC signal and the TMCC signal are present in each symbol at the same frequency position on the frequency axis, they are suitable to detect S/N by a delay detection between symbols. However the number of the signals is small.

On the other hand, the data signal and the SP signal are candidates from the viewpoint of the number of signals. Of the two signals, the data signal is highly modulated, so that it is difficult to obtain accuracy of S/N detection. Therefore, S/N detection by the non modulation SP signal is considered to be good. Although the SP signal is arranged at regular intervals (every 12 carriers) on the frequency axis, a carrier of the same frequency repeats every 4 symbols on the time axis. Therefore, a new idea is required to use the SP signal for the S/N detection.

As illustrated in FIG. 3, although the SP signal is inserted every 4 symbols, the number of the signals are as many as 468. Therefore, even when the OFDM signal includes an interference component, the SP signal has an advantage that the detection accuracy of the interference component can be higher than that of other pilot signals such as an AC signal or a TMCC signal.

Figure 4:
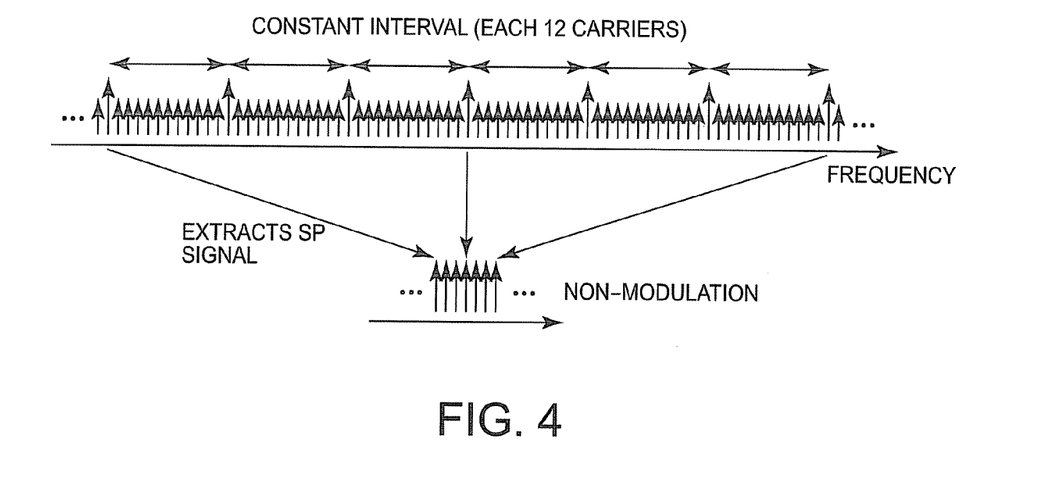
FIG. 4 is a diagram illustrating an arrangement of the SP signal.

FIG. 4 illustrates an arrangement of the SP signal. The SP signal exists every 12 carriers at constant intervals. Thus, the SP signal can be extracted by sub-sampling $1/12$ of signal from the OFDM signal. Furthermore, since the SP signal is non modulation signal, it is inferred that information of multi-path interference component can be easily detected. In addition, even when S/N is not directly obtained from the SP signal, it is only necessary to perform relative evaluation between the FFT windows, so that the SP signal is considered to be optimal to detect the interference component.

Hereinafter, embodiments of the invention will be described with reference to the drawings.

Figure 5:
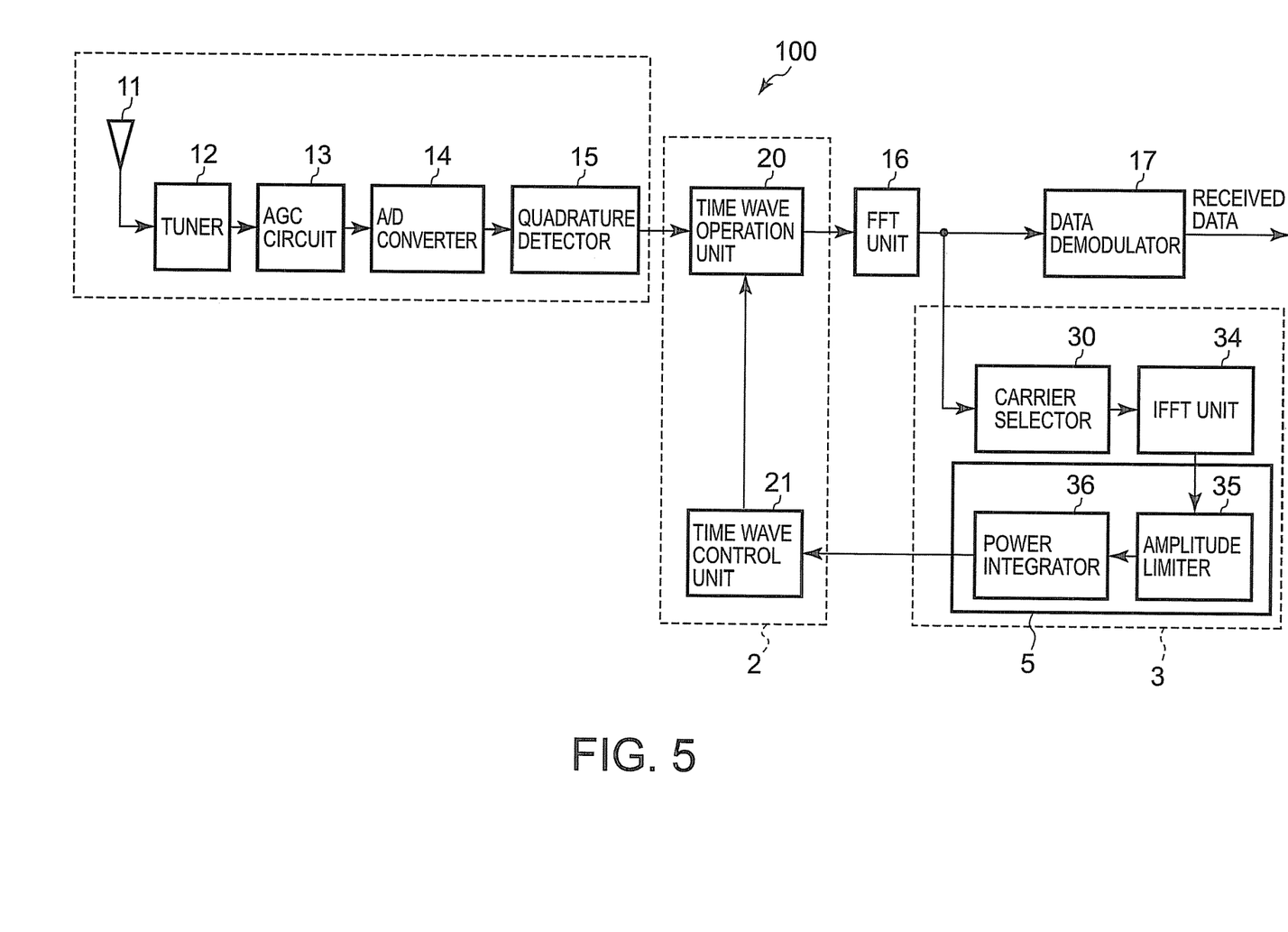
FIG. 5 is a block diagram illustrating a configuration of an OFDM signal receiving system according to a first embodiment of the invention.

A first embodiment of the invention will be described with reference to FIG. 5. FIG. 5 is a block diagram illustrating a configuration of the OFDM signal receiving system according to a first embodiment of the invention.

The OFDM signal receiving system 100 in FIG. 5 is provided with a signal receiving unit 1, a time wave processing unit 2, an FFT unit 16, a data demodulator 17, and a reception quality processing unit 3.

The signal receiving unit 1 includes an antenna 11, a tuner 12, an AGC (Automatic Gain Control) circuit 13, an A/D converter 14, and a quadrature detector 15. The time wave processing unit 2 includes a time wave operation unit 20 and a time wave control unit 21. Further, the reception quality processing unit 3 includes a carrier selector 30, an Inverse Fast Fourier Transform (IFFT) unit (hereinafter IFFT unit) 34, and a reception quality measurement unit 5. The reception quality measurement unit 5 includes an amplitude limiter 35 and a power integrator 36.

The signal receiving unit 1 has a function to receive the OFDM signal and to convert the OFDM signal into a baseband OFDM signal.

In the signal receiving unit 1, the OFDM signal received by the antenna 11 is input to the tuner 12. The tuner 12 converts the frequency of the input OFDM signal from a radio frequency band into an IF band. The AGC circuit 13 controls the level of the signal output from the tuner 12 so as to be constant and outputs the signal to the A/D converter 14. The A/D converter 14 converts the input analog signal into a digital signal and outputs the digital signal to the quadrature detector 15. The quadrature detector 15 converts the input digital signal into a baseband OFDM signal.

The time wave operation unit 20 has a function to perform a predetermined calculation on a time wave signal that is an output from the signal receiving unit 1. Specifically, the time wave operation unit 20 performs a calculation to be a countermeasure against various deterioration factors on the baseband OFDM signal converted by the quadrature detector 15. The calculation is controlled by the time wave control unit 21.

The calculation, as a countermeasure against various deterioration factors, includes a calculation to detect the optimal FFT window position, which is performed in the FFT window search, for example.

The time wave control unit 21 controls the calculation performed by the time wave operation unit 20 in accordance with reception quality data output from the reception quality processing unit 3. An output from the time wave operation unit 20 is provided to the FFT unit 16.

The FFT unit 16 performs an FFT calculation on the output from the time wave operation unit 20, and converts the OFDM signal from a signal in the time domain into a signal in the frequency domain. The FFT unit 16 supplies the OFDM signal converted into the signal in the frequency domain to the data demodulator 17.

The data demodulator 17 performs reverse processing to modulation processing performed on a transmitting side, for the OFDM signal of the frequency domain which is inputted from the FFT unit 16, so that the data demodulator 17 restores original data. For example, each subcarrier of the OFDM signal is modulated by a modulation technique such as PSK modulation and QAM modulation. The data demodulator 17 restores the original data by demodulation processing corresponding to the modulation method of each subcarrier.

In the reception quality processing unit 3, the OFDM signal in the frequency domain that is the output from the FFT unit 16 is provided to the carrier selector 30.

The carrier selector 30 extracts a specific frequency component from the provided OFDM signal of the frequency domain, and output the specific frequency component to the IFFT unit 34. At this time, the carrier selector 30 extracts the specific frequency component at regular intervals, for example.

The carrier selector 30 is assumed to extract a frequency component of subcarrier used to measure the reception quality from the OFDM signal in the frequency domain. The SP signal exists every 12 carriers on the frequency axis. Therefore, when extracting the SP signal, the carrier selector 30 performs sub-sampling of $1/12$ of the OFDM signal in the frequency domain. In this way, the SP signal is extracted from the OFDM signal in the frequency domain.

The IFFT unit 34 performs IFFT on the frequency component extracted by the carrier selector 30.

The reception quality measurement unit 5 measures quality of the output signal from the IFFT unit 34, and generates reception quality data. The amplitude limiter 35 limits the amplitude of the output signal from the IFFT unit 34 within a predetermined size. In this way, a sharp rising peak is cut out from the amplitude of the output signal from the IFFT unit 34. In the signal output from the amplitude limiter 35, only a signal level including many interference components remains.

The power integrator 36 integrates electric power of the signal whose amplitude is limited by the amplitude limiter 35 to calculate the sum of power, and supplies the sum of power to the time wave control unit 21.

The sum of power calculated by the power integrator 36 indicates the reception quality. When the signal, whose amplitude is limited, is an interference component, the sum of power outputted from the power integrator 36 is a large value which is obtained by integrating the noise component. Therefore, the larger the sum of power output from the power integrator 36, the worse the reception quality is estimated.

Figure 6A:
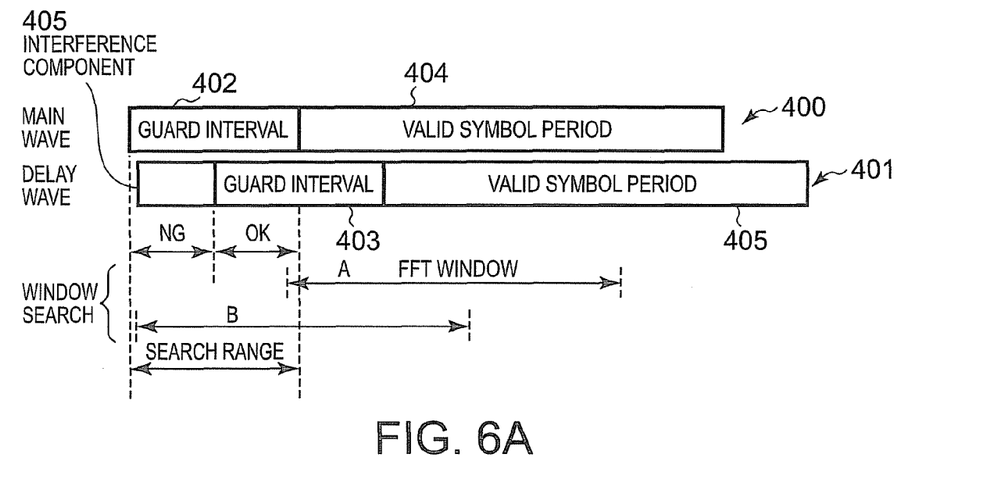
FIG. 6A is a diagram illustrating a relationship among the main wave, the delay wave, and window searches A and B.

FIG. 6A is illustrates a main wave 400 and a delay wave 401 which comes in a guard interval 402.

The main wave 400 includes a guard interval 402 and a valid symbol period 404. The delay wave 401 includes an interference component 405, a guard interval 403, and a valid symbol period 405.

Further, FIG. 6A illustrates a case in which the FFT window by the window search is in a permissive range not including an interference component (window search A) and a case in which the FFT window is in a non-permissive range including an interference component (window search B).

Figure 6B:
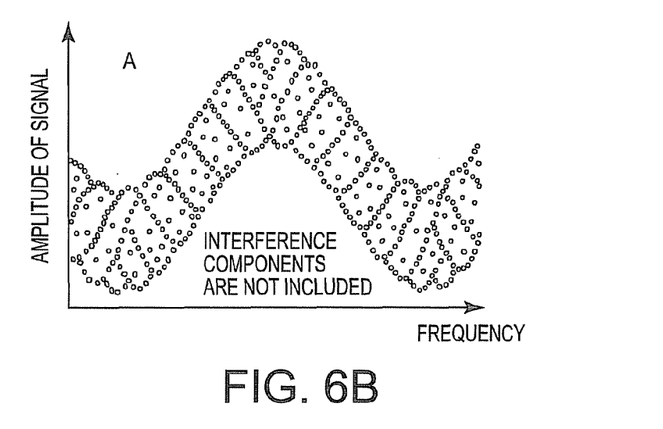
FIG. 6B is a diagram illustrating an observation result of signal amplitude distribution of frequency components in a case of the window search A.
Figure 6C:
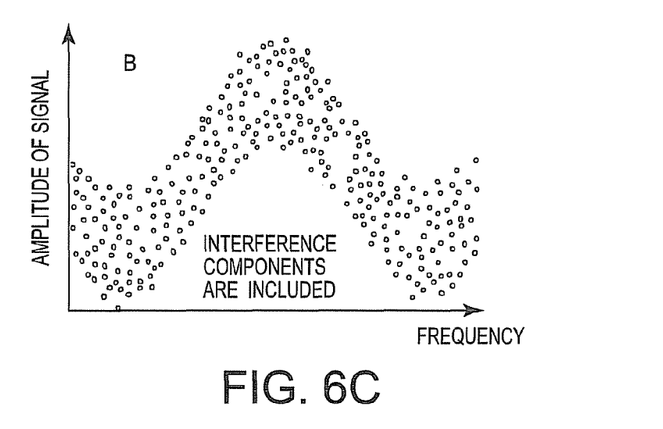
FIG. 6C is a diagram illustrating an observation result of signal amplitude distribution of frequency components in a case of the window search B.

FIGS. 6B and 6C illustrate observation results of signal amplitude distribution (vertical axis) of frequency components (horizontal axis) of the SP signal after extracting the SP signal in the cases of the window search A and the window search B.

FIG. 6B is the signal amplitude distribution of frequency components in a case in which any interference component is not included corresponding to the window search A. Two sin waves of the main wave and the delay wave overlap each other, so that the signal amplitude distribution of frequency components shows a regular pattern.

On the other hand, FIG. 6C is the signal amplitude distribution of frequency components in a case in which an interference component is included corresponding to the window search B. In addition to the overlap of the main wave and the delay wave, the interference component further overlaps them. Therefore, the signal amplitude distribution of frequency components shows a random pattern compared with the case in FIG. 6B.

Figure 7A:
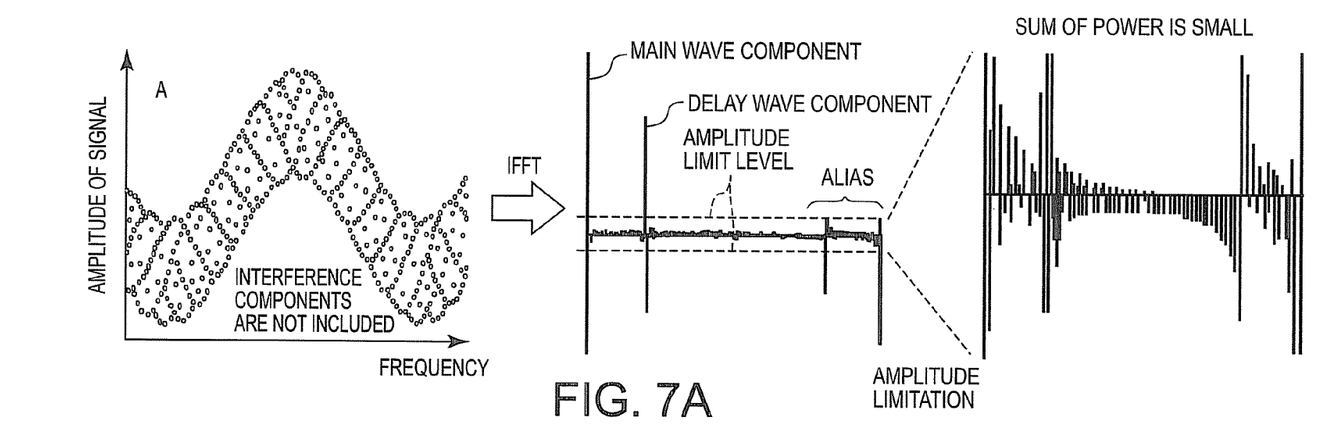
FIG. 7A is a diagram illustrating a delay profile obtained after IFFT of an SP signal in the case of the window search A.
Figure 7B:
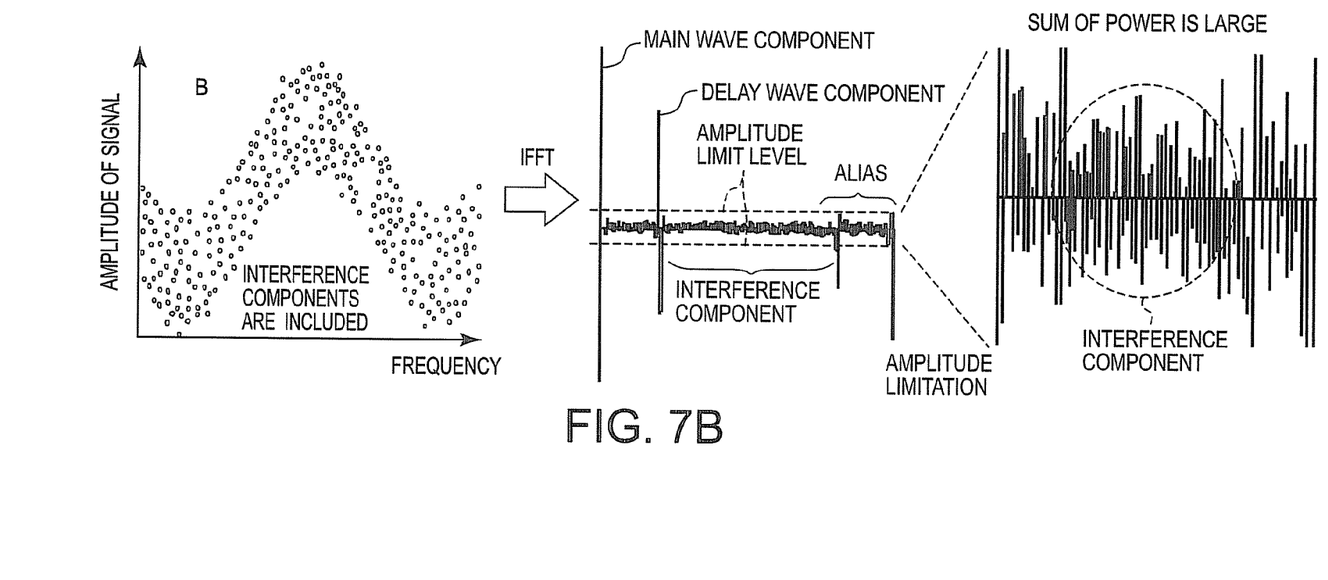
FIG. 7B is a diagram illustrating a delay profile obtained after IFFT of an SP signal in the case of the window search B.

FIGS. 7A and 7B illustrate delay profiles obtained after IFFT of the SP signal in the cases of the window search A and the window search B in FIGS. 6B and 6C. FIG. 7A is the delay profile in the case in which any interference component is not included corresponding to the window search A. FIG. 7B is the delay profile in the case in which an interference component is included corresponding to the window search B.

In both cases of the window search A and the window search B, the delay profiles include components of the main wave, the delay wave, and aliases as sharp signal amplitude peaks. The aliases are generated when sub-sampling $1/12$ of the subcarrier of the OFDM signal so as to extract the SP signal as illustrated in FIG. 4.

The components of the main wave, the delay wave, and aliases having a sharp signal amplitude peak are approximately the same in both cases of the window search A and the window search B. However, in an interval in which any signal peak is not included, there is a difference of amount of interference component between the window search A and the window search B.

Therefore, the amplitude limiter 35 limits the amplitude of the delay profile obtained after performing IFFT on the SP signal to detect an amount of interference component of the delay profile obtained after performing IFFT on the SP signal. In this way, the amplitude of the post-IFFT output signal is limited to a predetermined size, i.e., the signal amplitude peak portion is cut off, and mainly the interference component remains. The sum of power of the interference component signal is calculated by the power integrator 36. The electric power in the window search B which includes an interference component is larger than that in the window search A.

The smaller the sum of power is, the smaller the interference component is and the better the reception condition is. On the other hand, the larger the sum of power is, the larger the interference component is and the worse the reception condition is. Therefore, the quality of the delay profile can be determined by the sum of power of the interference component signal calculated by the power integrator 36.

As described above, in the first embodiment, the SP signal is set as the pilot signal to be used to determine quality. Further, the SP signal is extracted from the OFDM signal in the frequency domain, and the amplitude of the post-IFFT SP signal is limited to a predetermined size. Subsequently, the sum of power of the signal whose amplitude is limited is calculated. Finally, a predetermined calculation, which is a countermeasure against various deterioration factors, is performed on the time wave signal based on the calculation result. The FFT window, for example, is controlled to be an optimal position by the calculation, and the OFDM signal receiving system according to the first embodiment can obtain good reception quality.

Figure 8:
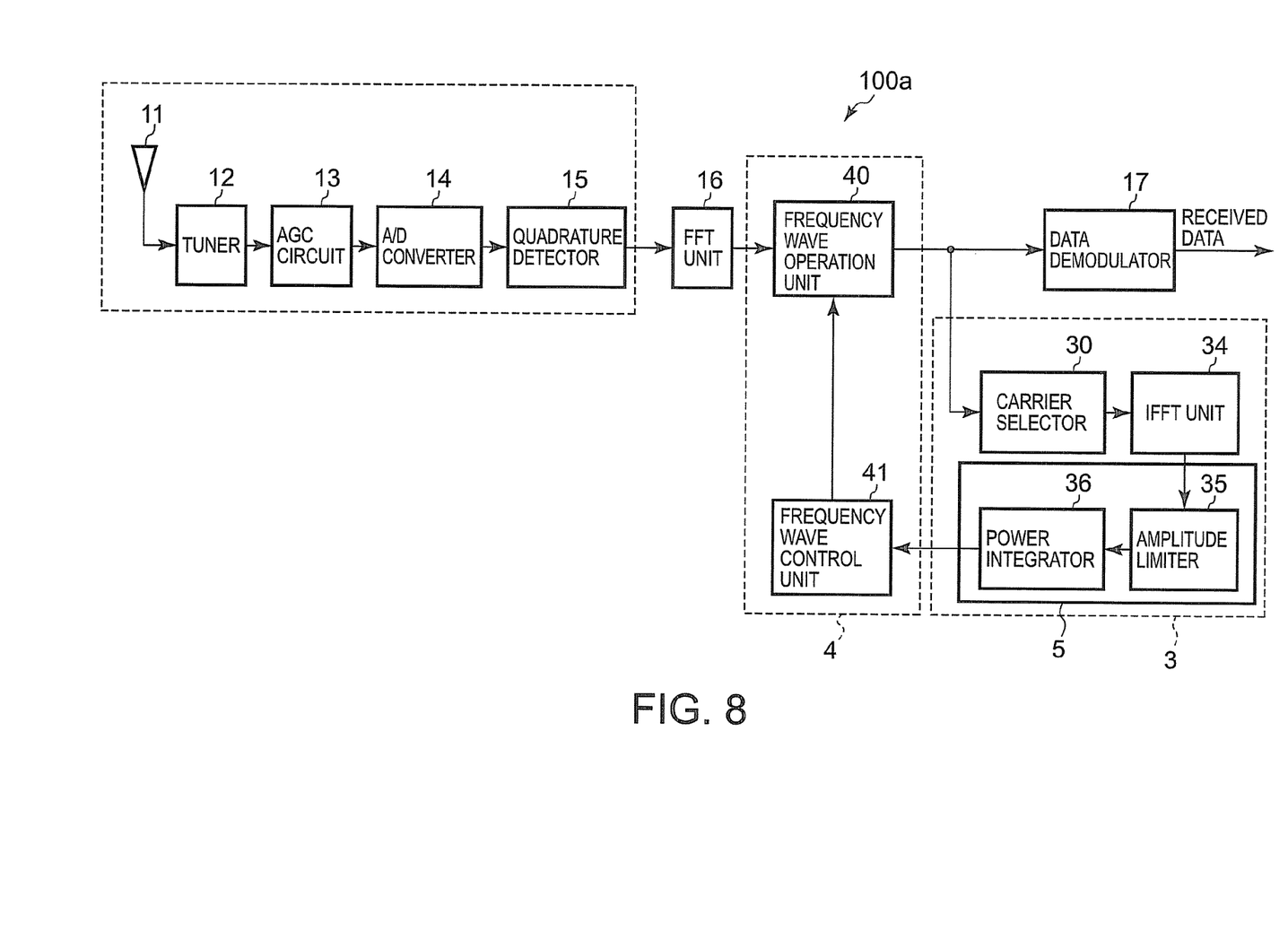
FIG. 8 is a block diagram illustrating a configuration of the OFDM signal receiving system according to a second embodiment of the invention.

A second embodiment of the invention will be described with reference to FIG. 8. FIG. 8 is a block diagram illustrating a configuration of the OFDM signal receiving system according to the second embodiment of the invention. The same portions as those in FIG. 5 are given the same reference numerals.

The OFDM signal receiving system 100a in FIG. 8 includes a signal receiving unit 1, a FFT unit 16, a frequency wave processing unit 4, a data demodulator 17, and a reception quality processing unit 3.

The frequency wave processing unit 4 includes a frequency wave operation unit 40 and a frequency wave control unit 41.

The difference between the embodiment illustrated in FIG. 8 and the first embodiment illustrated in FIG. 5 is that the FFT unit 16 is arranged in a later stage of the quadrature detector 15 in the embodiment. The FFT unit 16 performs conversion processing from a time domain wave to a frequency domain wave. Therefore, the frequency wave processing unit 4, which performs wave processing in the frequency domain, is arranged in the later stage of the FFT unit 16. Since the configuration other than the above is the same as that in FIG. 5, the detailed description of the configuration other than the above will be omitted.

The FFT unit 16 performs an FFT calculation on the output from the quadrature detector 15, and converts the OFDM signal in the time domain into the OFDM signal in the frequency domain. The FFT unit 16 supplies the OFDM signal in the frequency domain to the frequency wave operation unit 40.

The frequency wave operation unit 40 performs a predetermined calculation on the frequency-domain OFDM signal output from the FFT unit 16. Specifically, the frequency wave operation unit 40 performs a calculation as a countermeasure against various deterioration factors on the OFDM signal in the frequency domain. The calculation is controlled by the frequency wave control unit 41.

The frequency wave control unit 41 controls the calculation performed by the frequency wave operation unit 40 in accordance with reception quality data outputted from the reception quality processing unit 3. The output from the frequency wave operation unit 40 is provided to the data demodulator 17.

The data demodulator 17 performs reverse processing, to modulation processing performed on a transmitting side, for the signal inputted from the frequency wave operation unit 40, so that the data demodulator 17 restores original data.

In the reception quality processing unit 3, the frequency-domain OFDM signal outputted from the frequency wave operation unit 40 is provided to the carrier selector 30.

The carrier selector 30 extracts only a specific frequency component from the provided OFDM signal in the frequency domain, in other words, extracts only a frequency component of subcarrier used to measure the reception quality, and outputs the frequency component to the IFFT unit 34.

The IFFT unit 34 performs IFFT on the frequency component extracted by the carrier selector 30.

The reception quality measurement unit 5 measures quality of the output signal from the IFFT unit 34, and generates reception quality data. The amplitude limiter 35 limits the amplitude of the output signal from the IFFT unit 34 within a predetermined size.

The power integrator 36 integrates electric power of the signal whose amplitude is limited by the amplitude limiter 35 to calculate the sum of power, and supplies the sum of power to the time wave control unit 21.

In the same way as in the first embodiment, the sum of power calculated by the power integrator 36 indicates the reception quality.

As described above, also in the second embodiment, in the same way as in the first embodiment, the SP signal is extracted from the OFDM signal in the frequency domain by setting the SP signal as the pilot signal used to determine quality. The amplitude of the post-IFFT SP signal is limited to a predetermined size, and the sum of power of the signal whose amplitude is limited is calculated. In the second embodiment, a predetermined calculation, which is a countermeasure against various deterioration factors, is performed on the OFDM signal in the frequency domain based on the calculation result of the sum of power. The OFDM signal receiving system according to the second embodiment can obtain good reception quality by the calculation.

Figure 9:
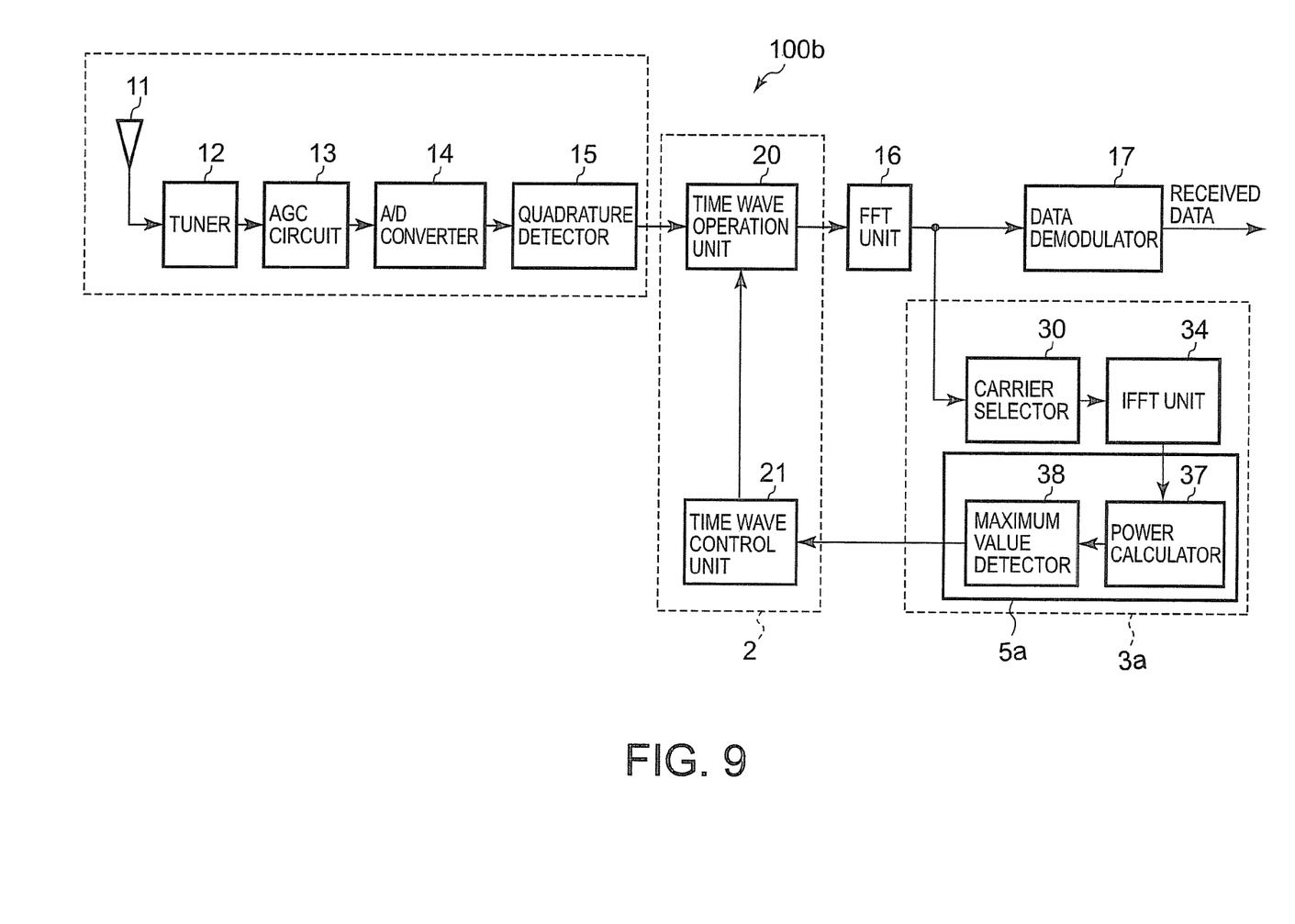
FIG. 9 is a block diagram illustrating a configuration of the OFDM signal receiving system according to a third embodiment of the invention.

A third embodiment of the invention will be described with reference to FIG. 9. FIG. 9 is a block diagram illustrating a configuration of the OFDM signal receiving system according to the third embodiment of the invention. The same portions as those in FIG. 5 are given the same reference numerals.

The OFDM signal receiving system 100b in FIG. 9 is provided with a signal receiving unit 1, a time wave processing unit 2, an FFT unit 16, a data demodulator 17, and a reception quality processing unit 3a.

The reception quality processing unit 3a includes a carrier selector 30, and an IFFT unit 34, and a reception quality measurement unit 5a.

The reception quality measurement unit 5a includes a power calculator 37 and a maximum value detector 38.

The difference between the embodiment illustrated in FIG. 9 and the first embodiment illustrated in FIG. 5 is that a configuration of the reception quality measurement unit 5a in the reception quality processing unit 3a is different from that of the first embodiment. Since the configuration other than the above is the same as that in FIG. 5, the detailed description of the configuration other than the above will be omitted.

In the same way as in the first embodiment, the OFDM signal in the frequency domain that is the output from the FFT unit 16 is provided to the carrier selector 30 in the reception quality processing unit 3a. The carrier selector 30 extracts a specific frequency component, for example, extracts the SP signal.

The IFFT unit 34 performs IFFT on the frequency component extracted by the carrier selector 30.

The reception quality measurement unit 5a has a function to measure quality of the output signal from the IFFT unit 34 and generate reception quality data.

The power calculator 37 calculates electric power of the output signal from the IFFT unit 34.

The maximum value detector 38 detects a maximum value of the electric power calculated by the power calculator 37. The electric power calculated by the power calculator 37 includes electric power of the main wave and the delay wave, and it is indicated that the larger the maximum electric power is, the better the reception quality is.

In other words, the value of the maximum electric power detected by the maximum value detector 38 can be deemed to be data representing the reception quality. Therefore, the value of the maximum electric power detected by the maximum value detector 38 is provided to the time wave control unit 21 as the reception quality data.

The time wave control unit 21 controls the calculation performed by the time wave operation unit 20 in accordance with the reception quality data output from the reception quality processing unit 3a. The output from the time wave operation unit 20 is provided to the FFT unit 16.

The FFT unit 16 performs an FFT calculation on the output from the time wave operation unit 20, and converts the OFDM signal from a signal of the time domain into a signal in the frequency domain. The FFT unit 16 supplies the OFDM signal converted into the signal of the frequency domain to the data demodulator 17.

As described above, in the third embodiment, the maximum electric power of the output signal of the post-IFFT SP signal is detected by setting the SP signal as the pilot signal used to determine quality. Based on the detection result, a predetermined calculation, which is a countermeasure against various deterioration factors, is performed on the time wave signal. The FFT window, for example, is controlled to be an optimal position by the calculation so that the OFDM signal receiving system can obtain good reception quality.

Figure 10:
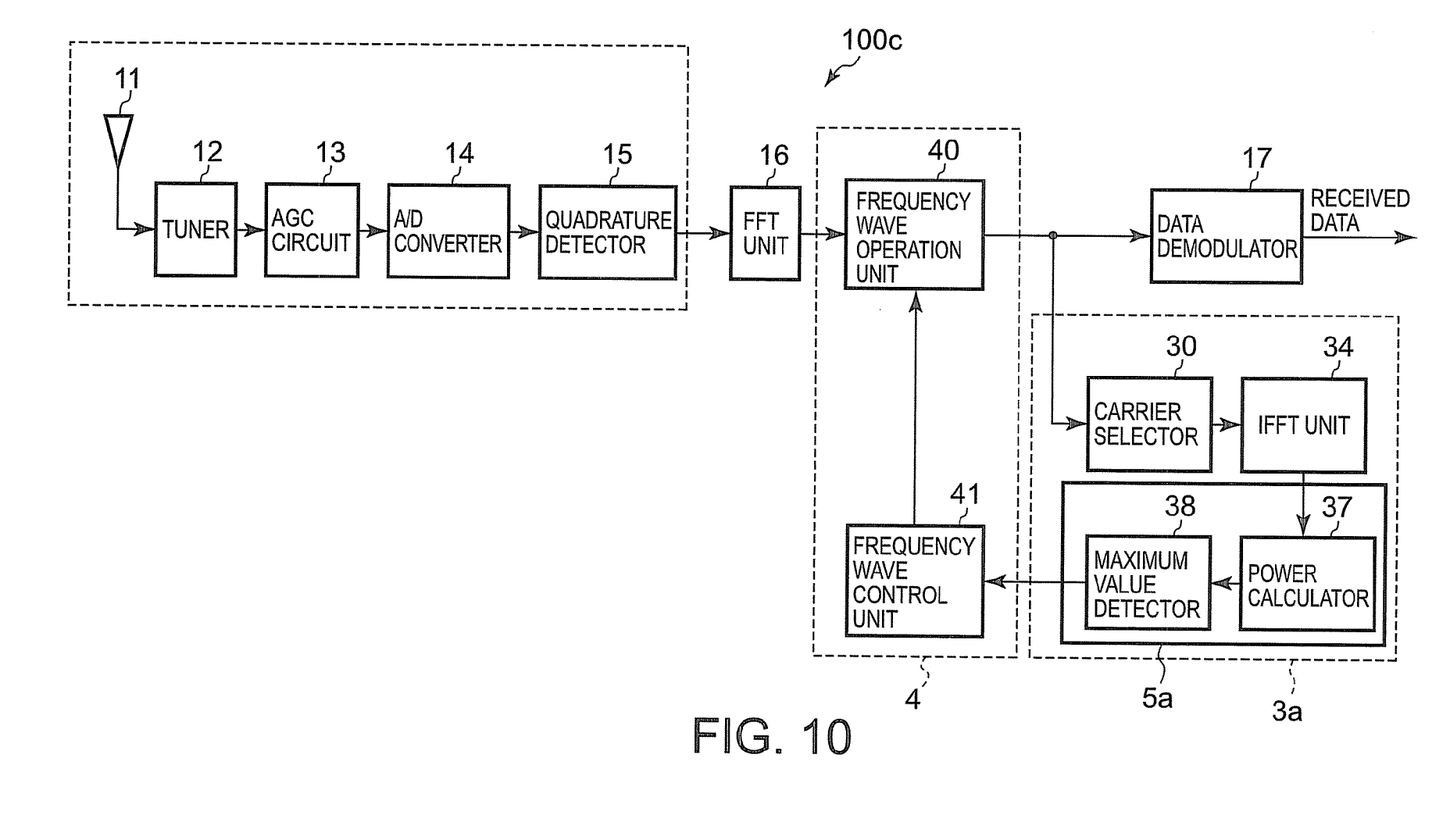
FIG. 10 is a block diagram illustrating a configuration of the OFDM signal receiving system according to a fourth embodiment of the invention.

A fourth embodiment of the invention will be described with reference FIG. 10. FIG. 10 is a block diagram illustrating a configuration of the OFDM signal receiving system according to the fourth embodiment of the invention. The same portions as those in FIG. 9 are given the same reference numerals.

The OFDM signal receiving system 100c in FIG. 10 is provided with a signal receiving unit 1, an FFT unit 16, a frequency wave processing unit 4, a data demodulator 17, and a reception quality processing unit 3a.

The difference between the embodiment illustrated in FIG. 10 and the third embodiment illustrated in FIG. 9 is that the FFT unit 16 is arranged in a later stage of the quadrature detector 15 in the embodiment. Therefore, the frequency wave processing unit 4 is arranged in the later stage of the FFT unit 16. Since the configuration other than the above is the same as that in FIG. 9, the detailed description of the configuration other than the above will be omitted.

The frequency wave processing unit 4 has the same configuration and function as those of the frequency wave processing unit 4 in the second embodiment illustrated in FIG. 8. Therefore, the detailed description of the frequency wave processing unit 4 will be also omitted.

The FFT unit 16 performs an FFT calculation on the output from the quadrature detector 15, and converts the OFDM signal of the time domain into the OFDM signal in the frequency domain. The FFT unit 16 supplies the OFDM signal of the frequency domain to the frequency wave operation unit 40.

The frequency wave operation unit 40 performs a calculation to be a countermeasure against various deterioration factors on a frequency wave signal that is the output from the FFT unit 16. The calculation is controlled by the frequency wave control unit 41.

The frequency wave control unit 41 controls the calculation performed by the frequency wave operation unit 40 in accordance with reception quality data which is outputted from the reception quality processing unit 3a. The output from the frequency wave operation unit 40 is provided to the data demodulator 17.

In the reception quality processing unit 3a, the frequency-domain OFDM signal outputted from the frequency wave operation unit 40 is provided to the carrier selector 30.

The carrier selector 30 extracts only a specific frequency component from the provided OFDM signal in the frequency domain. In other words, the carrier selector 30 extracts only a frequency component of subcarrier used to measure the reception quality, and outputs the frequency component to the IFFT unit 34.

The IFFT unit 34 performs IFFT on the frequency component extracted by the carrier selector 30.

In the same way as in the third embodiment, the power calculator 37 calculates electric power of the output signal from the IFFT unit 34 in the reception quality measurement unit 5a, and the maximum value detector 38 detects a maximum value of the electric power calculated by the power calculator 37.

The value of the maximum electric power detected by the maximum value detector 38 is provided to the frequency wave control unit 41 as the reception quality data.

As described above, in the third embodiment, the maximum electric power of the output signal of the post-IFFT SP signal is detected by setting the SP signal as the pilot signal used to determine quality. Further, based on the detection result, a predetermined calculation, which is a countermeasure against various deterioration factors, is performed on the OFDM signal of the frequency domain. The OFDM signal receiving system according to the fourth embodiment can obtain good reception quality by the calculation.

In the above embodiments, reception quality data other than S/N is generated by using the SP signal. Reception quality data and S/N data may be generated selectively in accordance with the reception environment, as the following fifth embodiment of the invention. The reception quality data is generated by using the SP signal. The S/N data is generated by using an AC signal or a TMCC signal.

Figure 11:
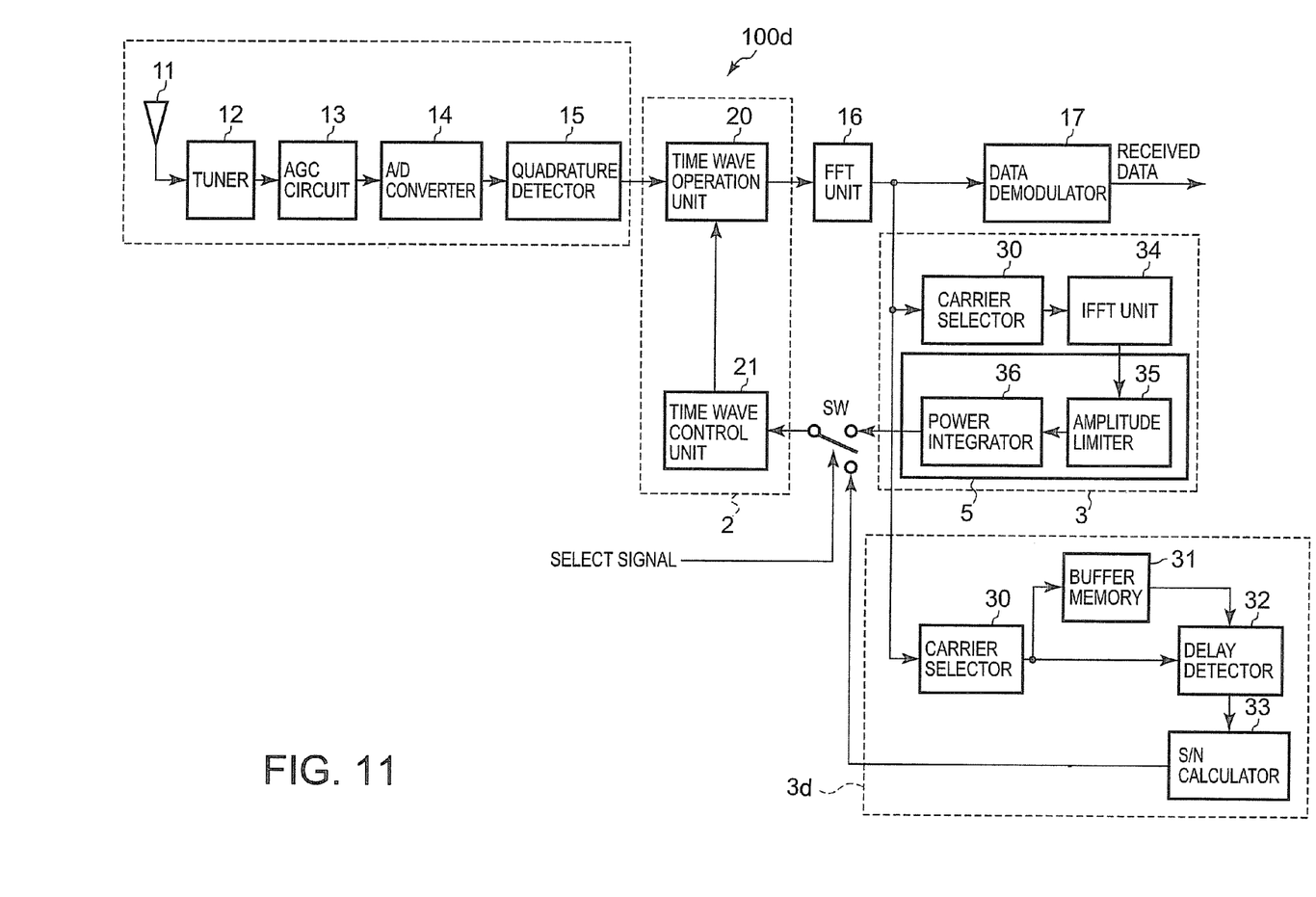
FIG. 11 is a block diagram illustrating a configuration of the OFDM signal receiving system according to a fifth embodiment of the invention.

The fifth embodiment of the invention will be described with reference FIG. 11. FIG. 11 is a block diagram illustrating a configuration of the OFDM signal receiving system according to the fifth embodiment. The same portions as those in FIG. 5 are given the same reference numerals.

The OFDM signal receiving system 100d in FIG. 11 is an OFDM signal receiving system in which a reception quality processing unit 3d is arranged along with the reception quality processing unit 3 in the OFDM signal receiving system illustrated in FIG. 5. The output of the reception quality processing unit 3 or the output of the reception quality processing unit 3d is selected by switching of a switch SW controlled by a select signal, and is inputted into the time wave control unit 21.

In the reception quality processing unit 3d, the OFDM signal in the frequency domain that is the output from the FFT unit 16 is provided to the carrier selector 30. The carrier selector 30 selects a subcarrier used to measure the reception quality from the OFDM signal in the frequency domain, and output the subcarrier to a buffer memory 31 and a delay detector 32.

The buffer memory 31 holds the subcarrier selected by the carrier selector 30, and output the subcarrier to the delay detector 32 after delaying by a predetermined symbol period.

The delay detector 32 performs a complex division on current subcarrier by the subcarrier delayed by a predetermined symbol period. In this way, a phase rotation remained in the OFDM signal of the frequency domain is corrected, and a deviation from original reference point can be calculated.

The AC signal and the TMCC signal are suitable for delay detection. The AC signal and the TMCC signal are present in each symbol at the same frequency position on the frequency axis. Therefore, S/N can be easily detected by performing delay detection between symbols.

An S/N calculator 33 calculates deviation from original reference point for the output of the delay detector 32, and integrates deviation value of the carrier selected by the carrier selector 30. The data obtained by the integration indicates the reception quality.

Figure 12:
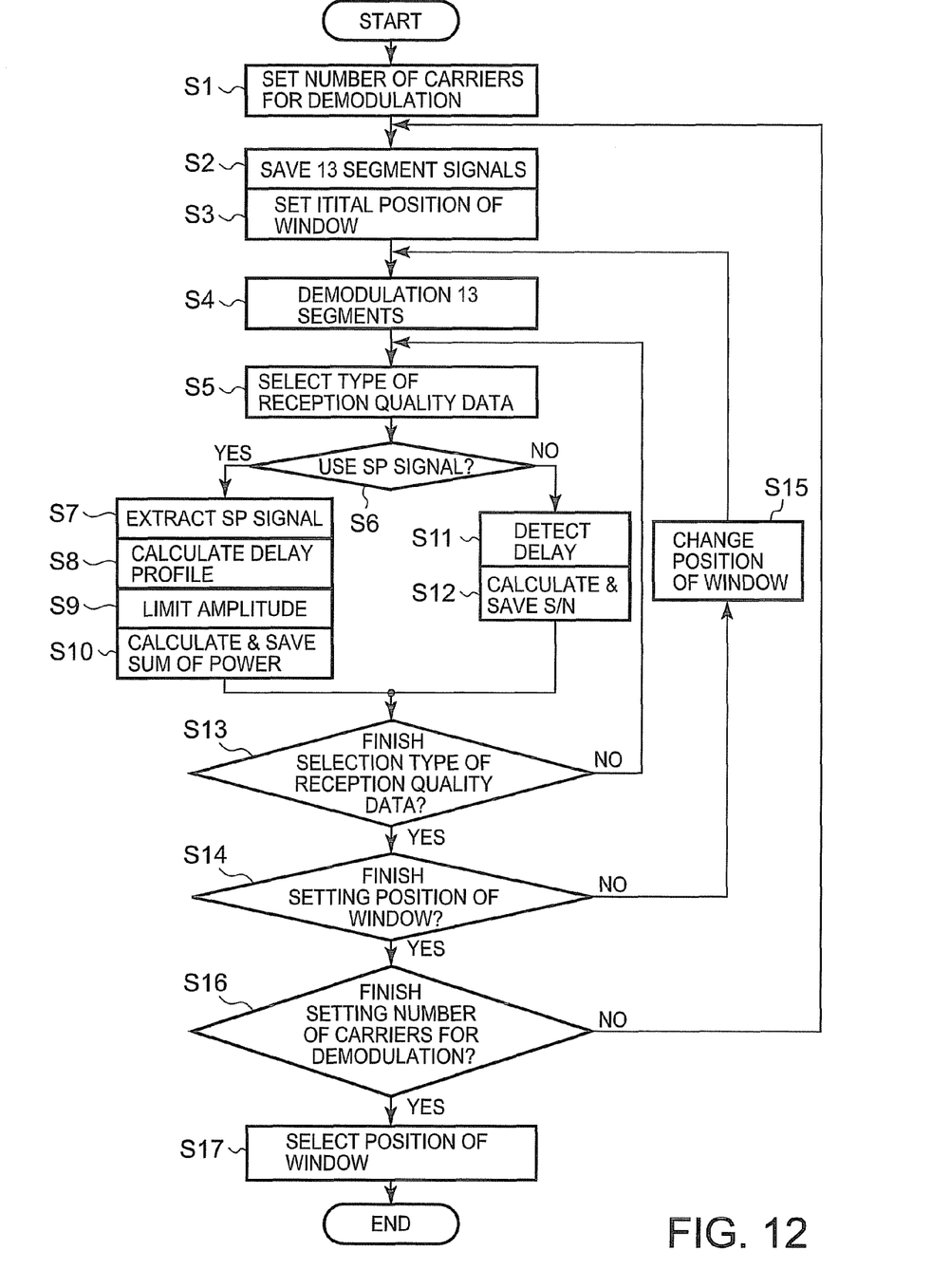
FIG. 12 is a flowchart explaining an operation of the OFDM signal receiving system according to the fifth embodiment of the invention.

FIG. 12 illustrates a flowchart explaining an operation to switch using the SP signal and the AC/TMCC signal, in the OFDM signal receiving system according to the embodiment.

Steps S1 to S5 and steps S13 to S17 are operational steps common to both ways of using the SP signal and the AC/TMCC signal.

The number of carriers for demodulation per symbol is set (step S1). Further, 13 segment signals are saved (step S2). An initial position of window is set (step S3). The 13 segment signals are demodulated (step S4). Selection of type of reception quality data are sequentially performed (step S5). In accordance with the selection of type of reception quality data in step S5, it is switched whether or not the SP signal is used (step S6).

When the SP signal is used ("Yes" in step S6), extraction of the SP signal (step S7), calculation of delay profile (step S8), limiting of amplitude (step S9), and calculation and save of sum of power (step S10) are sequentially performed.

On the other hand, when the SP signal is not used ("No" in step S6), delay detection (step S11) and calculation and save of S/N (respectively, step S12) are sequentially performed.

After performing the step S10 or S12, the process proceeds to a determination whether to finish the selection of the type of reception quality data (step S13). When the selection of the type of reception quality data is not finished ("No" in step S13), the process returns to step S5. When the selection of the type of reception quality data is finished ("Yes" in step S13), the process proceeds to a determination whether to finish the setting of the window position (step S14). When the setting of the window position is not finished ("No" in step S14), the process proceeds to changing the window position (step S15), and then returns to the step S4. When the setting of the window position is finished (Yes in step S14), the process proceeds finishing the setting of the number of carriers for demodulation (step S16).

When the setting of the number of carriers for demodulation is not finished ("No" in step S16), the process returns to the step S2. When the setting of the number of carriers for demodulation is finished ("Yes" in step S16), the process proceeds to selecting the window position (step S17), and ends the series of operations.

In the embodiment, the reception quality processing unit 3d is added to the OFDM signal receiving system illustrated in FIG. 5. The reception quality processing unit 3d may be added to the OFDM signal receiving system illustrated in FIG. 9. In this case, the output of the reception quality processing unit 3a in FIG. 9 or the output of the reception quality processing unit 3d is selected by switching of the switch SW controlled by the selection signal, and is inputted into the time wave control unit 21.

Figure 13:
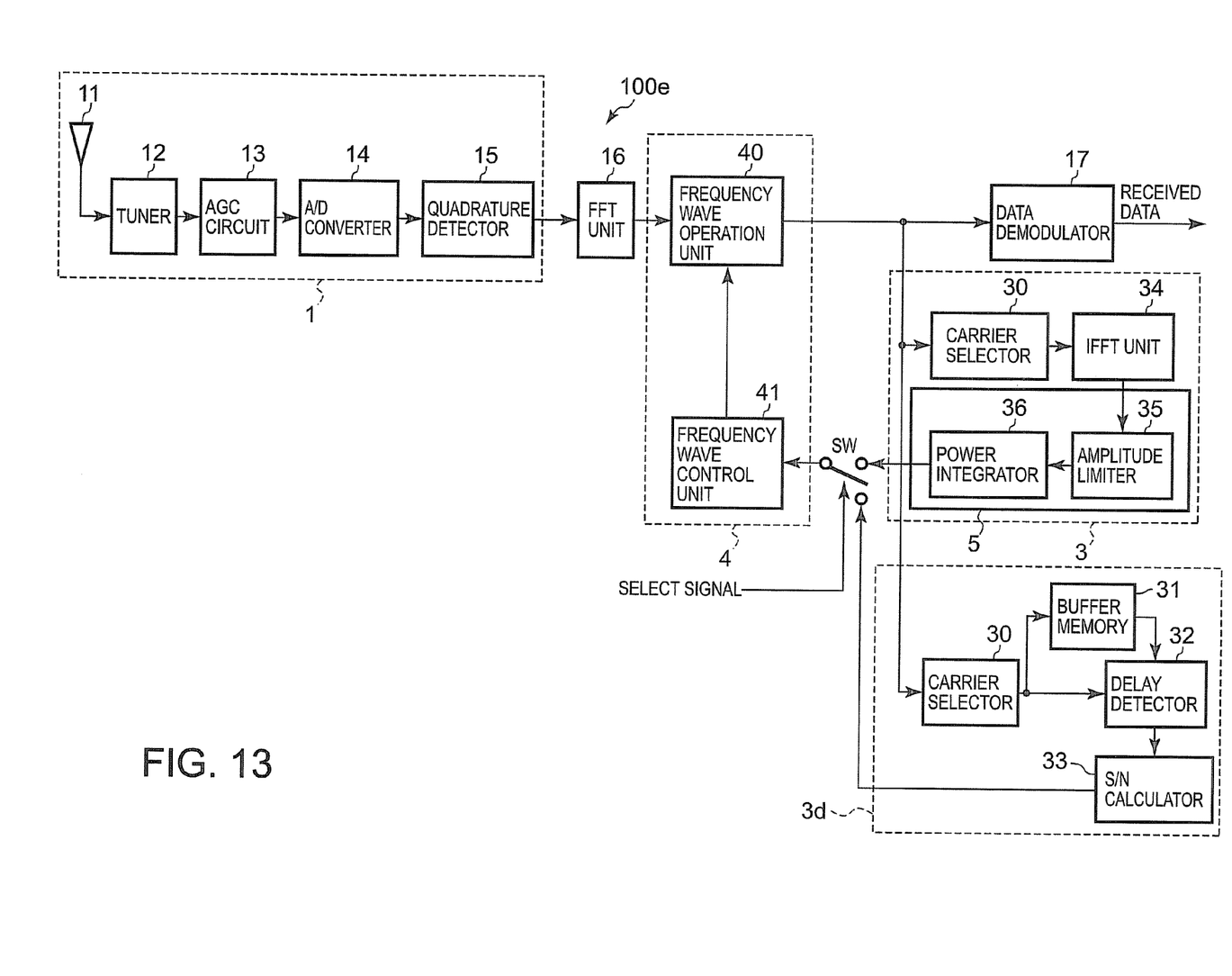
FIG. 13 is a block diagram illustrating a configuration of the OFDM signal receiving system according to a sixth embodiment of the invention.

A sixth embodiment of the invention will be described with reference FIG. 13. FIG. 13 is a block diagram illustrating a configuration of the OFDM signal receiving system according to the sixth embodiment. The same portions as those in FIGS. 5 and 11 are given the same reference numerals.

In the OFDM signal receiving system 100e shown in FIG. 13, the reception quality processing unit 3d is arranged along with the reception quality processing unit 3 in the OFDM signal receiving system illustrated in FIG. 8. The output of the reception quality processing unit 3 or the output of the reception quality processing unit 3d is selected by switching of the switch SW controlled by the selection signal, and is inputted into the frequency wave control unit 41.

In the embodiment, the OFDM signal in the frequency domain that is the output from the frequency wave operation unit 40 is provided to the carrier selector 30.

Since an operation to switch use of the SP signal and the AC/TMCC signal in the embodiment is the same as that in the fifth embodiment, the description of the switching operation will be omitted.

In the embodiment, the reception quality processing unit 3d is added to the OFDM signal receiving system illustrated in FIG. 8. The reception quality processing unit 3d may be added to the OFDM signal receiving system illustrated in FIG. 10. In this case, the output of the reception quality processing unit 3a shown in FIG. 10 or the output of the reception quality processing unit 3d is selected by switching of the switch SW controlled by the selection signal, and is inputted into the frequency wave control unit 41.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. An OFDM signal receiving system for receiving an OFDM signal, comprising:
    a signal receiving unit configured to receive the OFDM signal and to convert the OFDM signal into a baseband OFDM signal;
    a time wave operation unit configured to perform a predetermined calculation on a time wave signal that is an output of the signal receiving unit;
    a Fourier transform unit configured to perform a Fourier transform on an output of the time wave operation unit;
    a frequency component extraction unit configured to extract a specific frequency component from an output of the Fourier transform unit;
    an inverse Fourier transform unit configured to perform an inverse Fourier transform on the frequency component extracted by the frequency component extraction unit;
    a reception quality measurement unit configured to measure quality of an output signal of the inverse Fourier transform unit and generate reception quality data; and
    a time wave control unit configured to control the time wave operation unit based on the reception quality data.

2. The OFDM signal receiving system according to claim 1,
    wherein the reception quality measurement unit calculates a sum of power of a signal, the signal being obtained by limiting the amplitude of the output signal of the inverse Fourier transform unit within a predetermined size.

3. The OFDM signal receiving system according to claim 1,
    wherein the reception quality measurement unit calculates a maximum power of the output signal of the inverse Fourier transform unit.

4. The OFDM signal receiving system according to claim 1, wherein the frequency component extraction unit extracts a frequency component at regular intervals.

5. The OFDM signal receiving system according to claim 2, wherein the frequency component extraction unit extracts a frequency component at regular intervals.

6. The OFDM signal receiving system according to claim 3, wherein the frequency component extraction unit extracts a frequency component at regular intervals.

7. The OFDM signal receiving system according to claim 1, further comprising an S/N data measurement unit configured to measure S/N of the output signal of the Fourier transform unit and generate S/N data, wherein the time wave control unit controls the time wave operation unit based on the S/N data instead of the reception quality data.

8. The OFDM signal receiving system according to claim 7, further comprising a switch to select whether the data to be input into the time wave control unit is the reception quality data or the S/N data based on switching by a selection signal.

9. The OFDM signal receiving system according to claim 8, wherein the reception quality measurement unit calculates a sum of power of a signal to obtain the reception quality data, the signal being obtained by limiting the amplitude of the output signal of the inverse Fourier transform unit within a predetermined size.

10. The OFDM signal receiving system according to claim 8, wherein the reception quality measurement unit calculates a maximum power of the output signal of the inverse Fourier transform unit, as the reception quality data.

* * * * *